United States Patent [19]
Yamada et al.

[11] Patent Number: 5,502,703
[45] Date of Patent: Mar. 26, 1996

[54] OPTICAL DISC REPRODUCING APPARATUS

[75] Inventors: Yoichi Yamada; Tomohiko Kimura, both of Tokorozawa, Japan

[73] Assignee: Pioneer Electronic Corporation, Tokyo, Japan

[21] Appl. No.: 295,536

[22] Filed: Aug. 25, 1994

[30]　　Foreign Application Priority Data

Aug. 27, 1993　[JP]　Japan .................................. 5-213023

[51] Int. Cl.$^6$ ...................................................... G11B 7/00
[52] U.S. Cl. .................. 369/60; 369/48; 369/32; 369/58
[58] Field of Search ............................. 369/60, 48, 32, 369/58, 54, 195, 59, 43, 44.32, 47; 360/77.04, 72.1

[56]　　　　References Cited

U.S. PATENT DOCUMENTS 5,199,019　3/1993　Matsumura et al. ...................... 369/60
5,235,575　8/1993　Han ........................................... 369/48

FOREIGN PATENT DOCUMENTS

0516342　12/1992　European Pat. Off. .

*Primary Examiner*—Nabil Z. Hindi
*Attorney, Agent, or Firm*—Kane, Dalsimer, Sullivan, Kurucz, Levy, Eisele and Richard

[57]　　　　ABSTRACT

An optical disc reproducing apparatus repeatedly reproduces information recorded on an optical disc over a desired repeated reproduction interval from a starting position to an ending position. The apparatus is provided with: an optical pickup; a reproducing unit; a moving unit for moving the optical pickup from the ending position back to a predetermined position, which is positioned at a vicinity of the starting position, in a repeated reproduction operation; and a first memory for storing the information, which is recorded from the starting position to the predetermined position. The predetermined position is predetermined such that the information stored in the first memory have an information amount corresponding to a time enough for the moving unit to move the optical pickup from the ending position back to the predetermined position. The apparatus is also provided with a controller for controlling the reproducing unit to switch an object of reproduction from the information read by the optical pickup to the information of the first memory when the optical pickup arrives at the ending position and to reproduce the information of the first memory while the moving unit moves back the optical pickup.

12 Claims, 6 Drawing Sheets

OPTICAL DISC REPRODUCING APPARATUS

BACKGROUND OF THE INVENTION

1. Field of the Invention

The present invention generally relates to an optical disc reproducing apparatus for reproducing an optical disc to which various information is recorded, and more particularly, to an optical disc reproducing apparatus for repeatedly producing the information recorded on the optical disc.

2. Description of the Related Art

In a certain kind of optical disc reproducing apparatus, it is possible to specify the interval between two positions of the information recorded on the optical disc and reproduce the information repeatedly between those two positions. In this case, when the repeated reproduction starting position and the repeated reproduction ending position are inputted through an operation unit, a CPU (Central Processor Unit) supplies the positional information to a servo-signal processing unit. Then, the servo-signal processing unit performs the moving control of the optical pickup on the basis of the positional information. The recorded information read by the optical pickup, is supplied to an audio circuit through a signal processing unit, a digital filter and a D/A (Digital to Analog) convertor.

However, in this kind of optical disc reproducing apparatus, during the searching operation for the repeated reproduction i.e. while the optical pickup is moved from the repeated reproduction ending position to the repeated reproduction starting position, the reproduction sound is interrupted since the optical pickup cannot read the information during the searching operation. However, in case of the disc jockey (DJ) etc., it becomes quite desirable to keep the rhythm of the music by performing the repeated reproduction without interrupting the reproduction sound.

SUMMARY OF THE INVENTION

It is therefore an object of the present invention to provide an optical disc reproducing apparatus, which can perform the repeated reproduction without interrupting the reproduction sound even during the searching operation.

The above object of the present invention can be achieved by an optical disc reproducing apparatus for repeatedly reproducing information recorded on an optical disc over a desired repeated reproduction interval from a starting position to an ending position of the optical disc. The reproducing apparatus is provided with: an optical pickup for reading the information recorded on the optical disc; a reproducing unit for reproducing the information read by the optical pickup; a moving unit for moving the optical pickup from the ending position back to a predetermined position, which is positioned at a vicinity of the starting position on a side near the ending position of the starting position, in a repeated reproduction operation; a first memory for storing the information, which is recorded from the starting position to the predetermined position and is read by the optical pickup, the predetermined position being predetermined such that the information stored in the first memory have an information amount corresponding to a time enough for the moving unit to move the optical pickup from the ending position back to the predetermined position; and a controller for controlling the reproducing unit to switch an object of reproduction from the information read by the optical pickup to the information of the first memory when the optical pickup arrives at the ending position and to reproduce the information of the first memory while the moving unit moves the optical pickup from the ending position back to the predetermined position. When the reproduction of the first memory is finished, the reproduction is continued by use of the information read by the optical pickup from the predetermined position.

According to the above described present invention, while the optical pickup is moved back from the ending position toward the starting position, the information recorded on the optical disc cannot be read by the optical pickup as in the prior art apparatuses. However, during this period of moving back the optical pickup, the reproducing unit reproduces the information stored in the first memory in place of the information directly read by the optical pickup. Thus, the reproduced data such as an audio sound data, is not interrupted even during this searching operation i.e. while the moving unit moves back the optical pickup form the ending position toward the starting position.

In this manner, by the construction of the present invention, the repeated reproduction can be performed without interrupting the reproduction sound even during the period of searching operation.

In the above described construction of the present invention, there may be a small gap between the information reproduced from the first memory and the information directly reproduced from the optical pickup at the predetermined position. Namely, when switching the object of the reproduction from the information of the first memory to the information read by the optical pickup, the reproduction of the information of the optical pickup is started from the circumferential position where the optical pickup exists at the moment of switching. In other words, since it is unknown at which circumferential position the optical pick exists on the track including the predetermined position due to the rotation of the optical disc, it is unknown from which sound in the track is firstly reproduced at the moment of switching, in a strict sense, although the rotation speed of the optical disc is quite high.

Accordingly, in one aspect of the present invention, it is preferable that the reproducing apparatus is further provided with a second memory for temporarily and successively storing the information read by the optical pickup, from the predetermined position to the ending position, to successively output the stored information, with a time delay relative to the information read by the optical pickup, to the reproducing unit. The controller controls the reproducing unit to switch the object of reproduction from the information of the first memory to the information of the second memory when the reproducing unit finishes reproducing the information at the predetermined position of the first memory, and to start reproducing the information of the second memory next to the predetermined position, with the time delay to compensate a time difference between the information reproduced from the first memory and the information read by the optical pickup at the predetermined position. After the reproduction unit starts reproducing the information through the second memory with the time delay, this reproduction through the second memory is continued until the optical pickup arrives at the ending position. Such a second memory may consist of a ring buffer memory having a capacity enough to store the information of one track. By this construction, the possible gap between the information of the first memory and the information of the optical pickup at the predetermined position, can be eliminated by the time delay of the second memory, so that very smooth repeated reproduction can be realized, according to the present invention.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 2, which consist of FIG. 2a and FIG. 2b, are block diagrams respectively showing memory constructions of a first memory and a-second memory used in the embodiment;

DETAILED DESCRIPTION OF THE PREFERRED EMBODIMENTS

Referring to the accompanying drawings, an embodiment of the present invention will be now explained.

Construction of the Optical Disc Reproducing Apparatus

First of all, the overall construction of the optical disc reproducing apparatus is explained.

Figure 1:
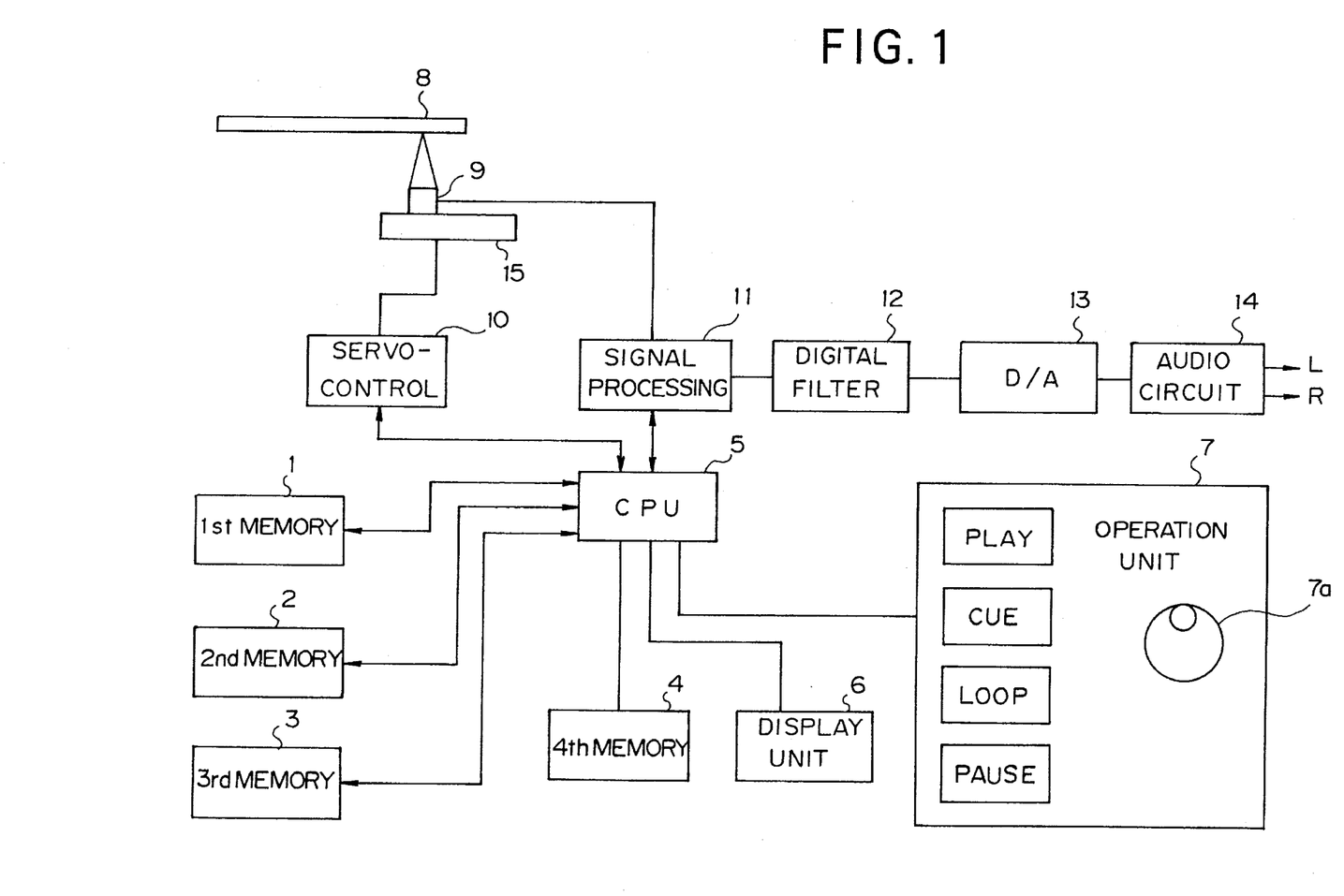
FIG. 1 is a block diagram of an optical disc reproducing apparatus as an embodiment of the present invention.

FIG. 1 shows a block diagram of an optical disc reproducing apparatus as an embodiment of the present invention.

In FIG. 1, the optical disc reproducing apparatus is provided with: an optical pickup 9 for reading the record information from an optical disc 8; a carriage motor 15 for moving the optical pickup 9 in the radial direction of the optical disc 8; a servo-control unit 10 for controlling the movement of the carriage motor 15; a signal processing unit 11 for performing an EFM (Eight to Fourteen Modulation) demodulation, an error correction etc., with respect to the record information of the optical disc 8, which is read by the optical pickup 9; a digital filter 12 for performing the oversampling operation; a D/A (Digital to Analog) convertor 13 for converting the digital value to the analog value; an audio circuit 14 for receiving the analog signal from the D/A convertor 13 and outputting R (Right) data and L (Left) data for audio speakers; a first memory 1; a second memory 2; a third memory 3; a fourth memory 4; a display unit 6 for displaying the track number, the time, the frame number etc.; an operation unit 7 having an operation panel including a PLAY key, a CUE key, a LOOP key, a PAUSE key and a jog dial 7a, for supplying various control signals for the optical pickup 9; and a CPU for controlling the operations of the servo-controlling unit 10, the signal processing unit 11, the first to fourth memories 1 to 4, the display unit 6 and the operation unit 7.

Constructions of the Memories

Nextly, the constructions of the memories 1 to 4, are explained.

Figure 2A:
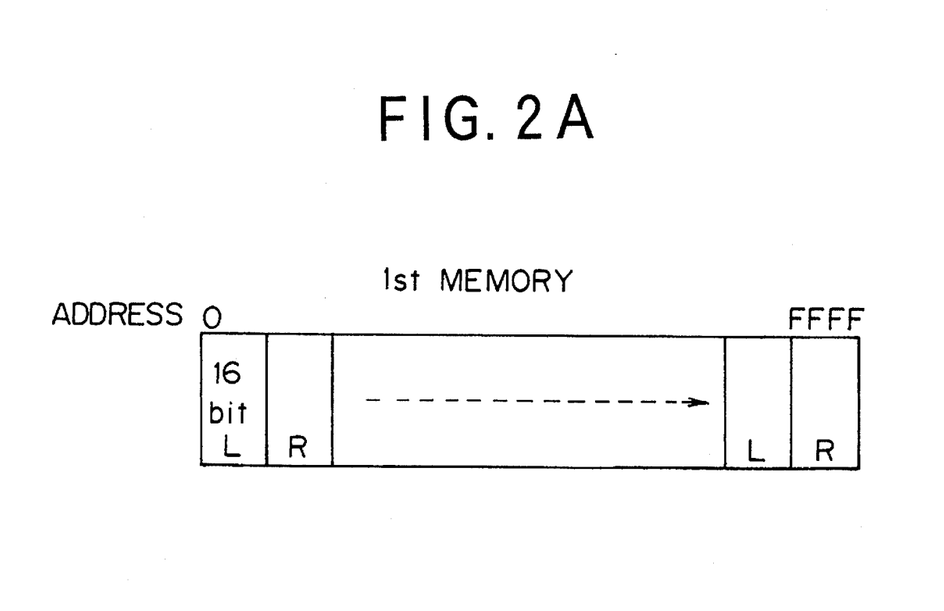
Figure 2B:
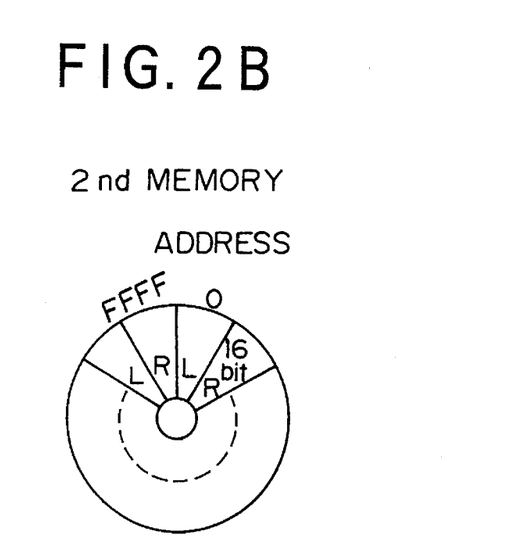

FIG. 2a shows the construction of the first memory 1, and FIG. 2b shows the construction of the second memory 2. Here, the first memory 1 is a memory which stores the record information of the optical disc from the repeated reproduction starting position for 0.7 second. The second memory 2 is a ring buffer memory which temporarily and successively stores the record information from the data next to the final data of the first memory 1 to the repeated reproduction ending position, and successively outputs the stored information to the signal processing unit 11. In the present embodiment, although the storing time period of the first memory 1 is set to 0.7 second, this time period value is just one example, and it may be set to voluntary time period value as long as it is enough to complete the searching operation of the repeated reproduction starting address by the pickup 9. The third memory 3 stores a writing address (WA: the address to which the audio data is written in the memory) and the reading address (RA: the address at which the audio data is read out. from the memory) of the second memory 2. The WA and the RA are advanced from the respectively specified positions every sampling cycle, by writing or reading one set of L and R data (i.e. +2 address every sampling cycle). The fourth memory 4 stores the start address, where the repeated reproduction is started by the pickup 9, and the end address, where the repeated reproduction is ended by the pickup 9.

Hereinbelow, the procedure of the repeatedly reproducing operation will be explained with referring to FIG. 3 to FIG. 6.

Specifying the Start Address

Firstly, the PAUSE key of the operation unit 7 is pressed, so that the CD player is set in a pause condition (i.e. a condition where the operations to reproduce one track amount of the audio data at the pause position and to perform jumping back by one track, are repeated). Nextly, while listening to the audio sound or confirming the frame display of the displaying unit 6, the jog dial of the operation unit 7 is rotated to search the position (address) where the repeated reproduction is desired to be started, and the CUE key of the operation unit 7 is pressed. In case that the jog dial is used, the desirable track can be adjusted by a unit of 1 frame. The CUE key may be pressed at a desirable position in the ordinary reproduction operation.

Figure 3:
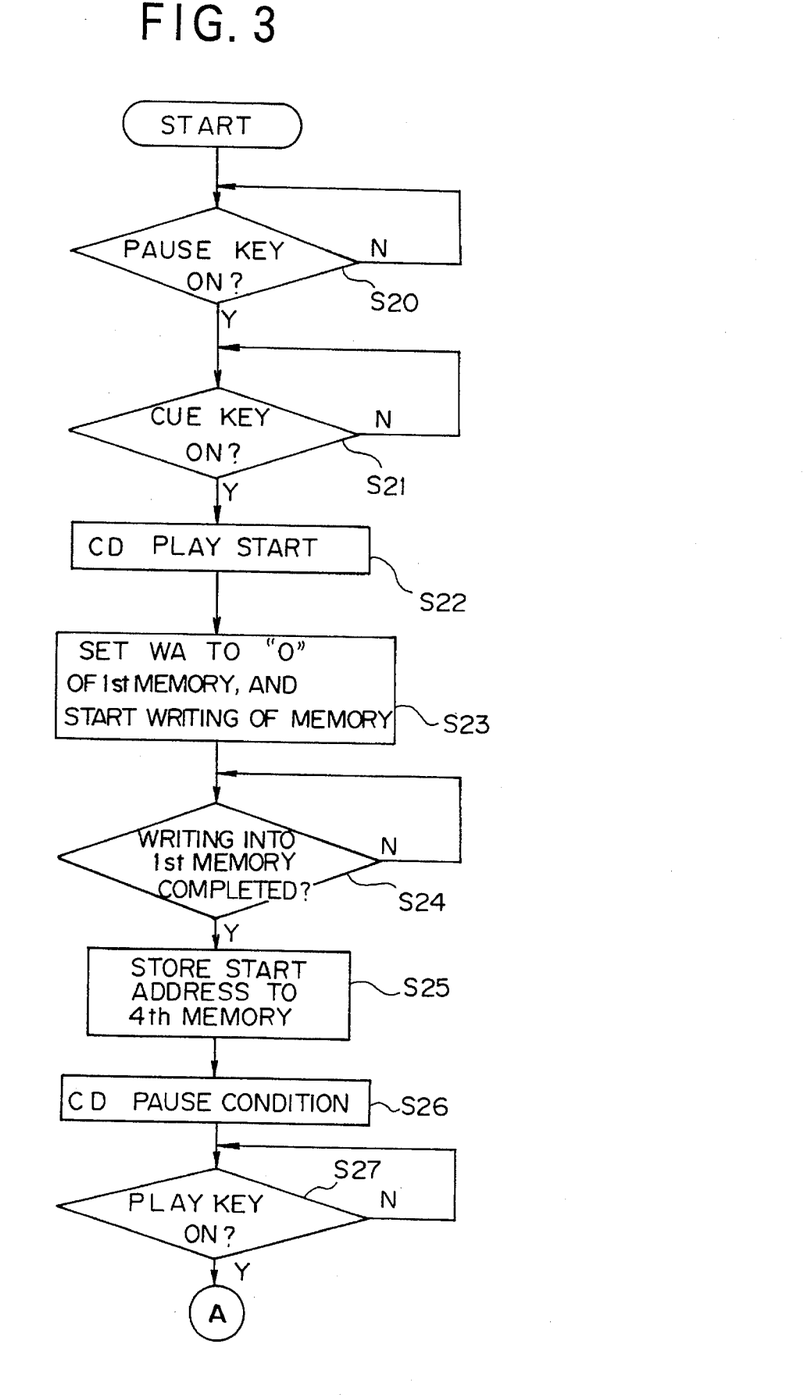
FIG. 3 is one flow chart for explaining a procedure of a loop reproduction operation of the embodiment.

In FIG. 3, the CPU 5 judges whether the PAUSE key is pressed or not (step S20). If the PAUSE key is judged to be pressed at the step S20 (YES), the CPU 5 judges whether the CUE key is pressed or not (step S21). If the CUE key is judged to be pressed at the step S21 (YES), the reproduction of the CD is started (step S22). Nextly, the CPU 5 sets the writing address (WA) to the "0" address number location of the first memory 1, and stores the disc record information from the repeated reproduction starting position to the first memory 1 (step S23). Then, the CPU 5 judges whether writing into the first memory 1 is completed or not (step S24). If writing into the first memory 1 is judged to be completed at the step S24 (YES), the CPU 5 stores the frame next to the final data of the first memory 1 to the fourth memory 4 as the start address (step S25), and sets the CD player to the pause condition (step S26).

Specifying the End Address

Nextly, the CPU 5 judges whether the PLAY key is pressed or not (step S27). If the PLAY key is judges to be pressed at the step S27 (YES), the reading address RA is set to the "038 address number location of the first memory 1, and reading from the first memory 1 is started (step S28 in FIG. 4). It is possible to omit the above explained steps 26 and 27 in FIG. 3, and to start reading from the first memory 1 automatically when the CUE key is pressed at the step S21 in FIG. 3.

Figure 4:
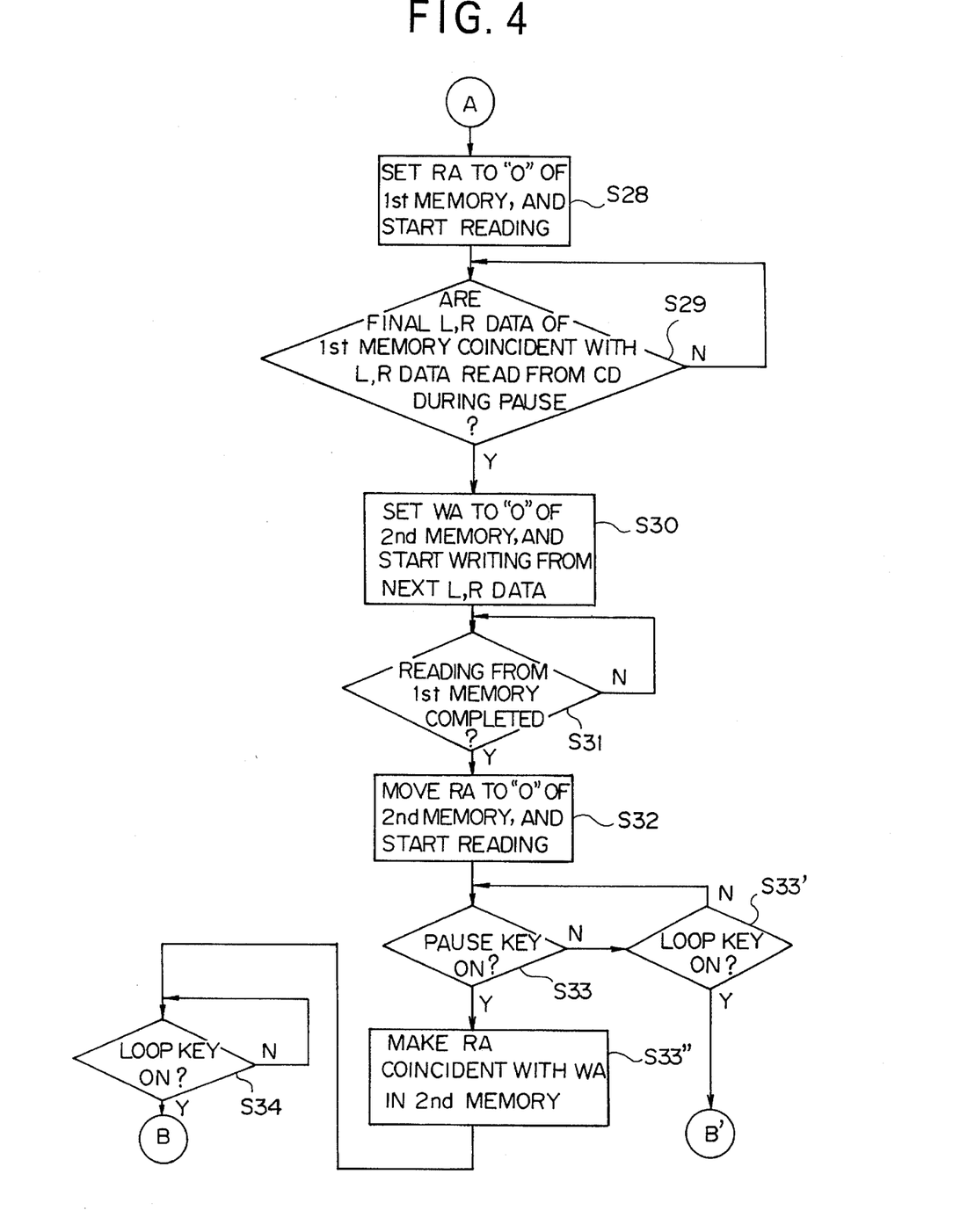
FIG. 4 is another flow chart for explaining the procedure of the loop reproduction operation of the embodiment.

In FIG. 4, the CPU 5 judges whether the final L, R data of the first memory 1 are coincident with the L, R data read from the CD by the pickup 9 during the pause operation or not (step S29 in FIG. 4). If they are coincident at the step S29 (YES), the writing address WA is set to the "0"address number location of the second memory 2. Then, writing the data next to the final data of the first memory 1 to the second memory 2 is started (step S30). Further, the CPU 5 judges whether reading from the first memory 1 is completed or not (step S31). If the reading from the first memory 1 is completed at the step S31 (YES), the reading address RA is moved (set) to the "0" address number location of the second memory 2. Then, reading from the second memory 2 is started (step S32). The writing address WA and the reading address RA are always stored into the third memory 3.

In the same manner as the determination of the position where the repeated reproduction is desired to be started, the PAUSE key is pressed at the vicinity of the position where the repeated reproduction is desired to be ended while listening to the reproduction sound from the second memory 2, and the LOOP key is pressed at the position, where the repeated reproduction is desired to be ended, to specify the endless. At this time, the second memory 2 reproduces the sound at the position where the pickup exists (at the writing address: WA). Namely, the reading address (RA) and the writing address (WA) are coincident with each other.

On the other hand, it is also possible to specify the end address by pressing the LOOP key at the desired position during the reproduction, without pressing the PAUSE key. If the LOOP key is pressed during the reproduction, the address where the reproduction sound is presently outputted is recognized, by subtracting the delay time from the address where the pickup is presently reading.

The CPU 5 judges whether the PAUSE key is pressed or not (step S33). If the PAUSE key is judged to be pressed at the step S33 (YES), the reading address RA of the second memory 2 is made coincident with the writing address WA (step S33"), and it is judged whether the LOOP key is pressed or not (step S34). If the LOOP key is judged to be pressed at the step S34 (YES), the address of the record information which is being presently reproduced by the pickup 9 (the writing address WA of the second memory 2) is stored to the fourth memory 4 as the end address (step 34 in FIG. 5). On the other hand, if the PAUSE key is not judged to be pressed at the step S33 (NO) in FIG. 4, the CPU 5 judges whether the LOOP key is pressed or not (step 33' in FIG. 4). If the LOOP key is judged to be pressed at the step S33'(YES), an address obtained by subtracting the delay time from the address (the writing address WA of the second memory 2) which is being reproduced by the pickup (namely, the time obtained by subtracting the reading address RA from the writing address WA of the second memory 2), is stored as the end address into the fourth memory 4 (step S35 in FIG. 5).

Operation of Repeated Reproduction

Figure 5:
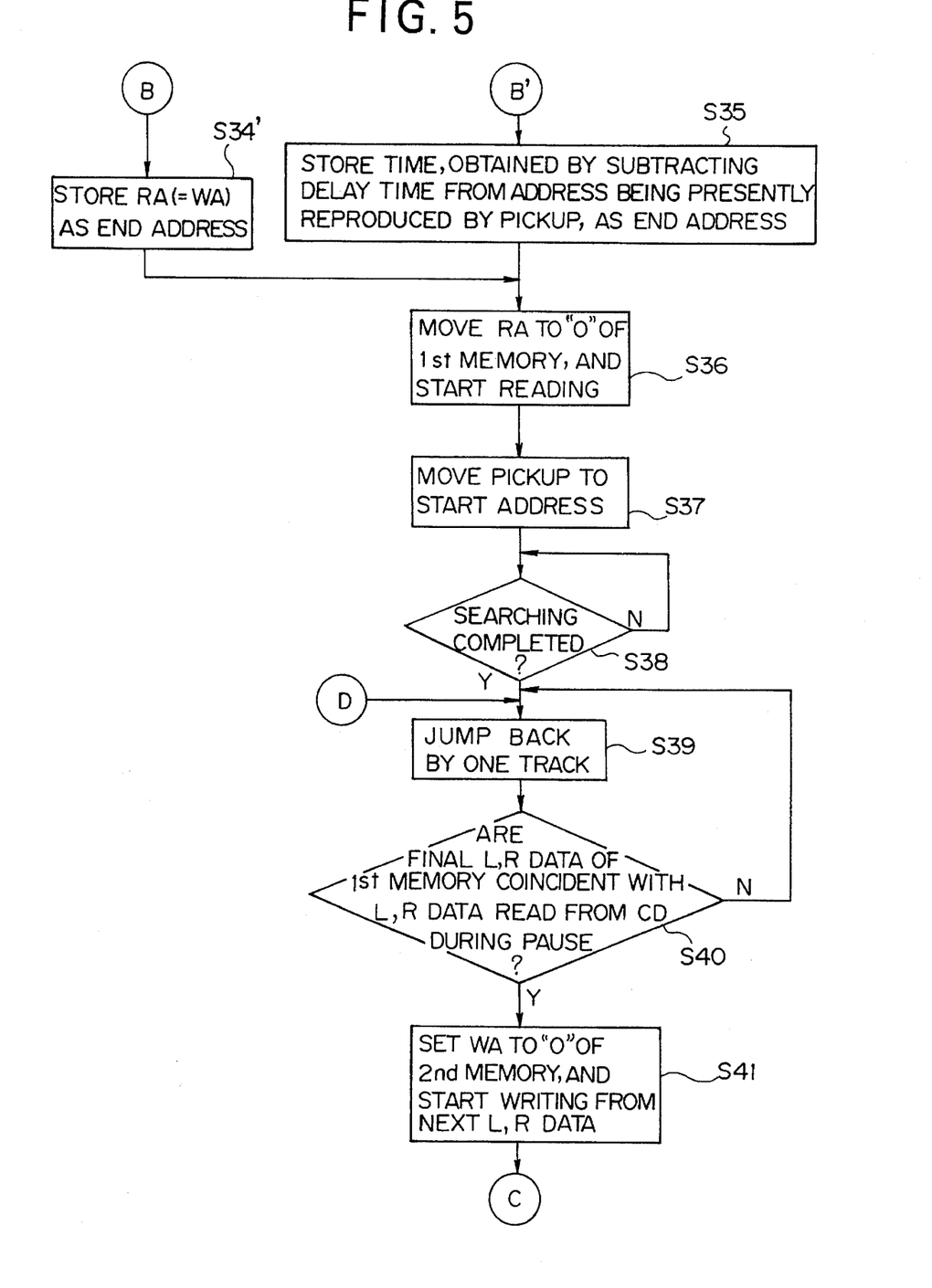
FIG. 5 is another flow chart for explaining the procedure of the loop reproduction operation of the embodiment.

Nextly, the CPU 5 moves (set) the reading address RA to the "0" address number location of the first memory, and starts reading from the first memory 1 (step S36 in FIG. 5). Then, the pickup 9 is moved to the start address (step S37). The CPU 5 judges whether the start address (frame unit) is detected or not i.e. whether searching of the start address is completed or not (step S38). If the start address is judged to be detected at the step S38 (YES), the pickup is jumped back by one track (step S39). Since the start address is determined in the above described manner, the final data of the first memory 1 can be certainly detected by jumping back the pickup just by one track.

Nextly, the CPU 5 compares the final L, R data of the first memory 1 with the L, R data which are being presently read by the pickup 9, and judges whether those L, R data are coincident (step S40). If those are not coincident (if it is overlooked) at the step S40 (NO), the above explained steps 39 and 40 are repeated. On the other hand, if those L, R data are coincident at the step S40 (YES), the writing address WA is set to the "0" address number location of the second memory 2, to start writing to the second memory 2 from the next L, R data (step S41 in FIG. 5).

Figure 6:
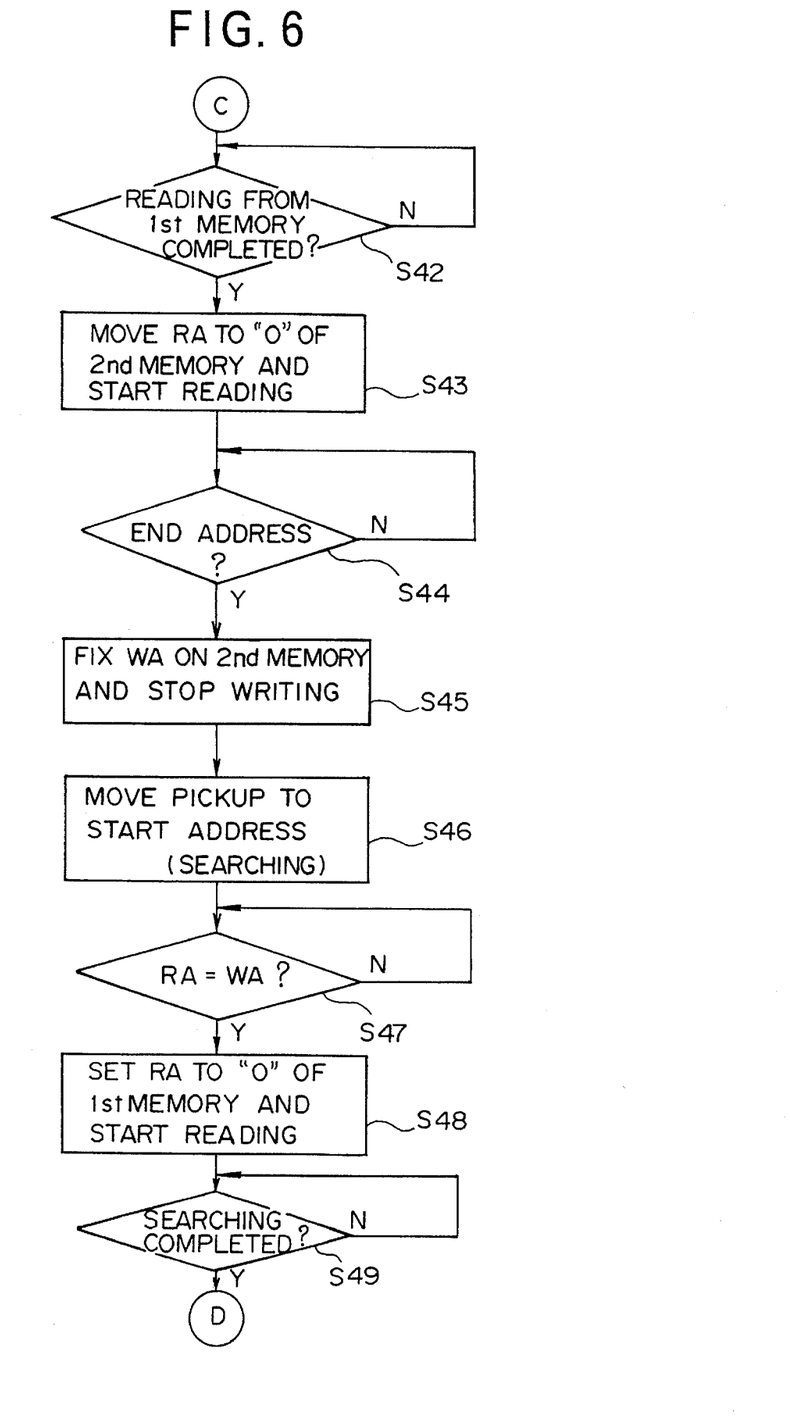
FIG. 6 is another flow chart for explaining the procedure of the loop reproduction operation of the embodiment.

Nextly, the CPU 5 judges whether reading from the first memory 1 is completed or not (step S42 in FIG. 6). If reading from the first memory is judged to be completed at the step S42 (YES), the reading address RA is moved (set) to the "0" address number location of the second memory, to start reading from the second memory 2 (step S43). Then, the repeated reproduction is continued by use of the output of the second memory with the time delay relative to the information read by the optical pickup. Nextly, the CPU 5 judges whether the pickup 9 has reached the end address or not (step S44). If it is judged to have reached the end address at the step S44 (YES), the writing address of the second memory 2 is fixed so as to stop writing to the second memory 2 (step S45). The pickup 9 is moved to the start address. Namely, the searching operation is performed (step S46). The CPU 5 judges whether the writing address WA of the second memory 2 which is stored in the third memory 3, and the reading address RA of the second memory 2 are coincident with each other or not (step S47). If they are coincident at the step S47 (YES), the reading address RA is set to the "0" address number location of the first memory 1, so as to start reading from the first memory (step S48 in FIG. 6). Then, the CPU 5 judges whether the start address (frame unit) is detected (searched) or not (step S49). If the start address is detected at the step S49 (YES), the above explained steps S39 to S49 are repeated.

As described above in detail, according the optical disc reproducing apparatus of the present embodiment, when the reproduction of the information stored in the second memory is finished, the reproduction of the information stored in the first memory is started. Thus, during the searching operation of the repeated reproduction, namely, while the pickup is moved form the end address to the start address, the reproduction sound can be outputted without interruption, so that the rhythm of the music is not deteriorated in case of using it in the DJ etc., while the repeated reproduction can be performed.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. An optical disc reproducing apparatus for repeatedly reproducing information recorded on an optical disc over a desired repeated reproduction interval from a starting position to an ending position of the optical disc, said apparatus comprising:

an optical pickup for reading the information recorded on the optical disc;

a reproducing means for reproducing the information read by said optical pickup;

a moving means for moving said optical pickup from the ending position back to a predetermined position, which is positioned at a vicinity of the starting position on a side near the ending position of the starting position, in a repeated reproduction operation;

a first memory for storing the information, which is recorded from the starting position to the predetermined position and is read by said optical pickup, the predetermined position being predetermined such that the information stored in said first memory have an information amount corresponding to a time enough for said moving means to move said optical pickup from the ending position back to the predetermined position;

a second memory for temporarily and successively storing the information read by said optical pickup, from the predetermined position to the ending position, to successively output the stored information, with a time delay relative to the information read by said optical pickup, to said reproducing means; and a controller for controlling said reproducing means to switch an object of reproduction from the information read by said optical pickup to the information of said first memory when said optical pickup arrives at the ending position and to reproduce the information of said first memory while said moving means moves said optical pickup from the ending position back to the predetermined position and to switch the object of reproduction from the information of the first memory to the information of the second memory when said reproducing means finishes reproducing the information at the predetermined position of the first memory, and to start reproducing the information of the second memory next to the predetermined position, with the time delay to compensate a time difference between the information reproduced from the first memory and the information read by the optical pickup at the predetermined position.

2. An apparatus according to claim 1, wherein said second memory comprises a ring buffer memory.

3. An apparatus according to claim 1, wherein said controller controls said moving means to pause said optical pickup at the predetermined position after moving said optical pickup thereto until said reproducing means finishes reproducing the information of the first memory.

4. An apparatus according to claim 1 wherein said first memory stores the information from the starting position for a fixed time duration.

5. An apparatus according to claim 1 further comprising:

an operation panel for specifying the desired repeated reproduction interval.

6. An apparatus according to claim 5 wherein said operation panel comprises:

a Jog dial to move the starting position; and a CUE key to set the starting position.

7. An apparatus according to claim 5, wherein said operation panel comprises a LOOP key to set the ending position.

8. An apparatus according to claim 1 further comprising:

a third memory for storing a writing address and a reading address of said second memory,
said controller controlling said second memory to store the information at the writing address, and to output the information at the reading address.

9. An apparatus according to claim 1 further comprising:

a fourth memory for storing an address of the starting position and an address of the ending position,
said controller controlling said moving means to move said optical pickup on the basis of the addresses stored in said fourth memory.

10. An apparatus according to claim 1, wherein said reproducing means comprises a signal processing unit, a digital filter, a D/A convertor, and an audio circuit to output audio data.

11. An apparatus according to claim 1, wherein said moving means comprises a carriage motor and a servo-control unit.

12. An apparatus according to claim 1 further comprising:

an operation panel for specifying the desired repeated reproduction interval, said operation panel including a LOOP key to set the ending position; and a fourth memory for storing an address of the starting position and an address of the ending position, said controller controlling said moving means to move said optical pickup on the basis of the addresses stored in said fourth memory, said controller calculating the address of the ending position by subtracting said time delay from an address which is being read by said optical pickup when said LOOP key is pressed, and controlling said fourth memory to store the calculated address of the ending position.

* * * * *